(12) United States Patent
Isosaki et al.

(10) Patent No.: US 12,198,321 B2
(45) Date of Patent: Jan. 14, 2025

(54) FRACTURE SURFACE ANALYSIS APPARATUS AND FRACTURE SURFACE ANALYSIS METHOD

(71) Applicant: Hitachi, Ltd., Tokyo (JP)

(72) Inventors: Yohei Isosaki, Tokyo (JP); Yosuke Ueki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 459 days.

(21) Appl. No.: 17/625,211

(22) PCT Filed: Apr. 7, 2020

(86) PCT No.: PCT/JP2020/015624
§ 371 (c)(1),
(2) Date: Jan. 6, 2022

(87) PCT Pub. No.: WO2021/005856
PCT Pub. Date: Jan. 14, 2021

(65) Prior Publication Data
US 2022/0270235 A1 Aug. 25, 2022

(30) Foreign Application Priority Data

Jul. 8, 2019 (JP) .................................. 2019-126799

(51) Int. Cl.
*G06T 7/00* (2017.01)
(52) U.S. Cl.
CPC .. *G06T 7/0004* (2013.01); *G06T 2207/10056* (2013.01); *G06T 2207/20084* (2013.01)
(58) Field of Classification Search
CPC ......... G06T 7/0004; G06T 2207/10056; G06T 2207/20084
See application file for complete search history.

(56) References Cited

U.S. PATENT DOCUMENTS 6,326,619 B1 * 12/2001 Michael ............... G01N 23/203
250/307
2013/0013223 A1 1/2013 Hirano et al.
(Continued)

FOREIGN PATENT DOCUMENTS

CN 108333331 A 7/2018
JP 2000-266613 A 9/2000
(Continued)

OTHER PUBLICATIONS

International Search Report, PCT/JP2020/015624, dated Jun. 30, 2020, 3 pgs.

*Primary Examiner* — Myron Wyche
(74) *Attorney, Agent, or Firm* — Volpe Koenig

(57) ABSTRACT

Provided are a fracture surface analysis apparatus and a fracture surface analysis method which enable a non-expert to conduct a fracture surface analysis just as well as an expert does. This fracture surface analysis apparatus is characterized by including a microscopic region observation unit that is provided with a first means for calculating an accuracy of fracture mode by using a first observation image, of a microscopic region of a to-be-analyzed object, acquired by an imaging means, a second means for calculating an observation condition for improving the accuracy of the fracture mode, and a third means for adjusting conditions for imaging the microscopic region by the imaging means, and that outputs the accuracy of fracture mode and the observation condition for improving the accuracy of fracture mode to a visualization means.

7 Claims, 5 Drawing Sheets

(56) References Cited

U.S. PATENT DOCUMENTS

| | | | |
|---|---|---|---|
| 2014/0169676 A1* | 6/2014 | Tanaka | G06V 30/268 |
| | | | 382/187 |
| 2015/0332445 A1 | 11/2015 | Harada et al. | |
| 2020/0337537 A1 | 10/2020 | Hirasawa et al. | |
| 2020/0380665 A1* | 12/2020 | Horii | G06F 17/15 |

FOREIGN PATENT DOCUMENTS

| | | | |
|---|---|---|---|
| JP | 2006-118876 A | 5/2006 | |
| JP | 2014-145694 A | 8/2014 | |
| JP | 2018-077719 A | 5/2018 | |
| JP | 2019-158423 A | 9/2019 | |
| JP | 2020-087570 A | 6/2020 | |
| WO | 2011/099270 A1 | 8/2011 | |
| WO | 2019/088121 A1 | 5/2019 | |

* cited by examiner

FRACTURE SURFACE ANALYSIS APPARATUS AND FRACTURE SURFACE ANALYSIS METHOD

TECHNICAL FIELD

The present invention relates to a fracture surface analysis apparatus and a fracture surface analysis method for performing fracture surface analysis of a structure.

BACKGROUND ART

Fracture surface analysis for specifying the cause and process of fracture of a fracture surface through macroscopic observation of the fracture surface by visual observation or the like and microscopic observation by an electron microscope is a routine means for investigating the cause of fracture of a structure. In the fracture surface analysis, a characteristic shape or pattern according to a fracture mode appearing on a fracture surface is captured. In the macroscopic observation, the shape of the fracture surface and the macroscopic characteristic pattern are captured, a fracture mode of each part of the fracture surface is estimated, and a crack initiation point is specified. In the microscopic observation, a fracture mode is specified and a fracture process is estimated in detail from the search for a characteristic pattern according to the fracture mode in each part of the fracture surface and the change in the characteristic pattern of the fracture surface according to the distance from the crack initiation point. While the fracture surface image acquired for fracture surface analysis is used to elucidate the fracture process, there is also an aspect in which the fracture surface image is used as objective evidence to indicate the cause of fracture for other people.

PTL 1 discloses a method of classifying the types of fracture surfaces by analyzing the shading of the observed fracture surfaces, and an observation apparatus.

CITATION LIST

Patent Literature

PTL 1: JP 2018-77719 A

SUMMARY OF INVENTION

Technical Problem

The fracture surface analysis largely depends on the determination based on implicit knowledge of skilled people, but in recent years, skilled people are aging, and there is an increasing demand for support and automation of the fracture surface analysis. In order to reproduce a series of fracture surface observation processes performed by a skilled person, it is required not only to classify a fracture mode from a microscopic observation image but also to determine an observation position in the microscopic observation on the basis of a result of estimating a fracture mode or a crack initiation point of each part of the fracture surface obtained by the macroscopic observation. In microscopic observation, it is considered that a skilled person searches for a site where a characteristic pattern corresponding to the fracture mode is most apparent, adjusts an imaging condition such as an observation magnification, and then acquires an image suitable as evidence indicating the fracture mode. Therefore, it is considered that a technique for supporting optimization of an imaging position and an imaging condition is required.

However, a specific method for achieving optimization of an imaging condition of a microscopic observation image has been hardly studied heretofore.

The present invention has been made to solve such problems. The present invention provides a fracture surface analysis apparatus and a fracture surface analysis method that support fracture surface analysis to enable even an unskilled person to perform fracture surface analysis similar to that by a skilled person.

Solution to Problem

A fracture surface analysis apparatus according to the present invention for achieving the above object includes: a first means that calculates a degree of certainty of a fracture mode with respect to a first observation image obtained from an imaging means for a micro region of an object to be analyzed; a second means that calculates an observation condition for improving the degree of certainty of the fracture mode; and a third means that adjusts an imaging condition of the imaging means for the micro region, the fracture surface analysis apparatus further including a micro region observation unit that outputs the degree of certainty of the fracture mode and the observation condition for improving the degree of certainty of the fracture mode to a visualization means.

A fracture surface analysis method according to the present invention is a fracture surface analysis method including: calculating a degree of certainty of a fracture mode with respect to a first observation image obtained from an imaging means for a micro region of an object to be analyzed; calculating an observation condition for improving the degree of certainty of the fracture mode; and adjusting an imaging condition of the imaging means for the micro region to display the degree of certainty of the fracture mode and the observation condition for improving the degree of certainty of the fracture mode, in which the degree of certainty of the fracture mode is obtained for a plurality of the first observation image having different imaging positions, and an imaging position having higher degree of certainty is indicated as the observation condition for improving the degree of certainty of the fracture mode.

A fracture surface analysis method according to the present invention is a fracture surface analysis method including: calculating a degree of certainty of a fracture mode with respect to a first observation image obtained from an imaging means for a micro region of an object to be analyzed; calculating an observation condition for improving the degree of certainty of the fracture mode; and adjusting an imaging condition of the imaging means for the micro region to display the degree of certainty of the fracture mode and the observation condition for improving the degree of certainty of the fracture mode, in which the first observation image is divided into a plurality of regions, the degree of certainty of the fracture mode is obtained for each of the plurality of regions obtained by dividing, and an imaging position in a divided region having higher degree of certainty is indicated as the observation condition for improving the degree of certainty of the fracture mode.

Advantageous Effects of Invention

According to the present invention, it is possible to image a characteristic pattern more clearly according to a fracture mode in microscopic observation, and it is possible to acquire a high-quality image as an objective basis for proving a fracture mechanism. Therefore, by using a fracture surface analysis apparatus according to the present invention, even an unskilled person can perform a fracture surface analysis at high speed, with high accuracy and high acceptability.

DESCRIPTION OF EMBODIMENTS

Hereinafter, preferred embodiments for carrying out the present invention will be described with reference to the drawings. The following is merely examples, and it is not intended to limit the content of the invention to the following specific embodiments. The invention itself can be modified into various aspects within the scope that satisfies the description of the CLAIMS.

Embodiments

Hereinafter, specific embodiments of the present invention will be described in detail with reference to FIGS. 1 to 5.

Figure 1:
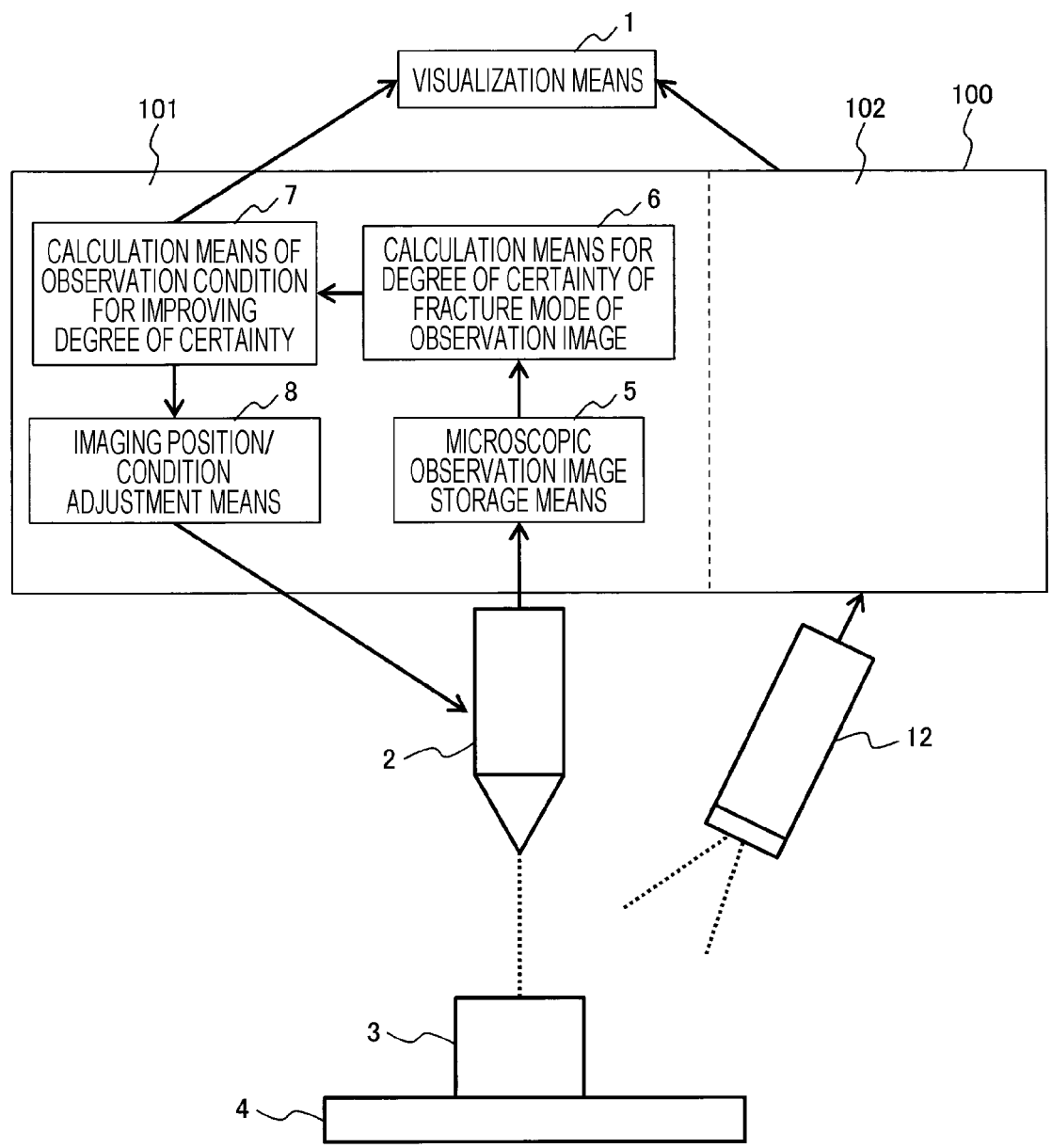
FIG. 1 is a diagram illustrating a configuration example of an embodiment of a fracture surface analysis apparatus of the present invention.

FIG. 1 is a diagram illustrating a configuration example of an embodiment of a fracture surface analysis apparatus of the present invention. A fracture surface analysis apparatus 100 according to the embodiment of the present invention is configured using a computer, and roughly includes, as processing functions, a macro region observation unit 102 for observing a macro region and a micro region observation unit 101 for observing a micro region.

The fracture surface analysis apparatus 100 includes an imaging means 2 for a micro region and an imaging means 12 for a macro region as input units thereof, and further includes a keyboard or the like as appropriate input means (not illustrated). The fracture surface analysis apparatus 100 may be connected to the outside via communication. The imaging means 2 and the imaging means 12 capture an entire image and a surface image of an object to be analyzed 3 installed on a stage 4.

The fracture surface analysis apparatus 100 further includes a visualization means 1 such as a monitor as an output unit thereof. The display content in the visualization means 1 will be described in detail with reference to FIG. 2, but an observation image of a macro region, an observation image of a micro region, observation conditions of observation in these regions, a processing determination result, and the like are displayed. The fracture surface analysis apparatus 100 may include the input unit and the output unit described above.

In the following description of the present invention, first, the display content in the visualization means 1, which is the final output, will be described, and thereafter, the micro region observation will be sequentially described.

Figure 2:
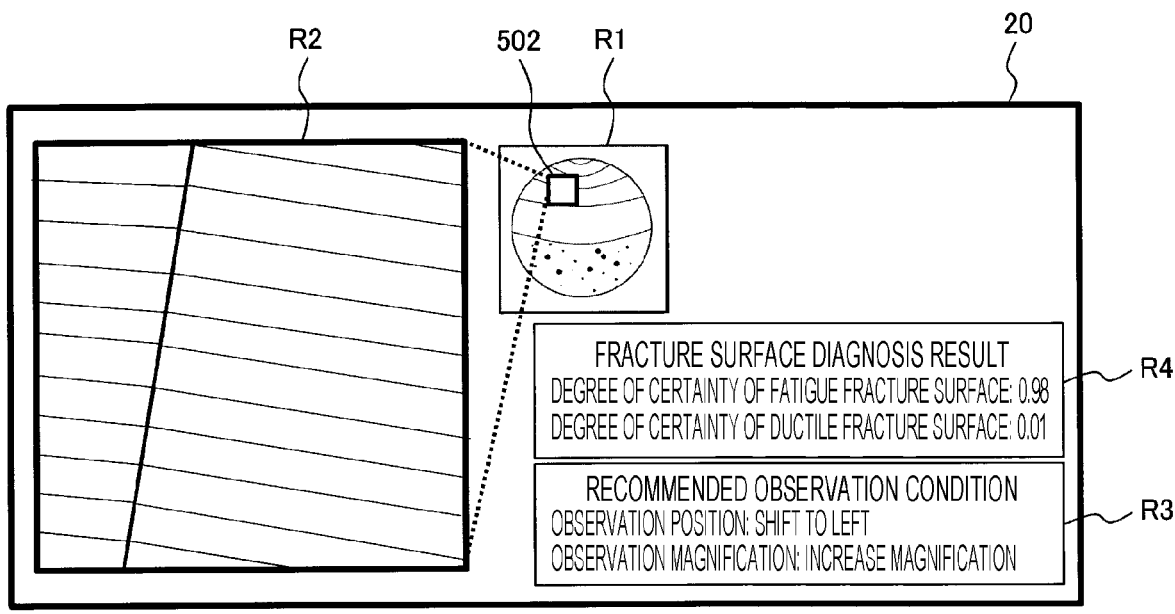
FIG. 2 is a diagram illustrating a screen configuration example in a visualization means 1.

FIG. 2 is a diagram illustrating a screen configuration example in the visualization means 1. A display screen 20 of the visualization means 1 includes, for example, four small display regions R. A small region R1 is an entire image for the entire object to be analyzed 3 obtained by the imaging means 12 for a macro region, and is a display screen region of a macro observation image.

In the display content of the small region R1 that displays the entire object, the region of a microscopic observation position 502 at that time is displayed in a square frame. As a result, an acquisition position of the microscopic observation image on a macro fracture surface becomes clear. A microscopic observation image at this time is displayed in a small region R2.

A small region R3 displays recommended observation conditions of microscopic observation as a processing result in the fracture surface analysis apparatus 100, and teaches operation contents to be operated by an observer. For example, the small region R3 teaches that the observation magnification should be increased.

A small region R4 displays a calculation result of a degree of certainty of a fracture surface mode of the observation image obtained as the processing result by the fracture surface analysis apparatus 100. In the illustrated example, as a result of the fracture surface diagnosis, it is indicated that a degree of certainty of the fatigue fracture surface at the relevant position is 0.98, and a degree of certainty of the ductile fracture surface is 0.01. The numerical value of the degree of certainty may indicate a value at the relevant position, or may be a difference with a numerical value of a degree of certainty at a position where observation is recommended for improving the degree of certainty of the fracture mode.

Next, in FIG. 1, processing of the macro region observation unit 102 will be described, and as a premise thereof, the imaging means 12 for a macro region, which is an input unit of the macro region observation unit 102, is mainly means for imaging the entire fracture surface of the object to be analyzed 3. Unlike the imaging means 2 for a micro region, the imaging means 12 for a macro region is not particularly preferably a means utilizing an electron beam, and may be an optical camera or the like.

The stage 4 is for installing the object to be analyzed 3. The object to be analyzed 3 has a fracture surface, and is fixed to the stage 4 with a tape or an adhesive. The stage 4 can be moved vertically up, down, left, and right, and adjustment of an observation position and focusing of an observation image by the imaging means 2 for a micro region are performed by moving the stage 4.

The macro region observation unit 102 processes the entire image captured by the imaging means 12 for a macro region, and forms an entire image for the object to be analyzed 3 obtained by the imaging means 12 for a macro region in the small region R1 in FIG. 1. In the entire image display, the region of the microscopic observation position 502 is displayed together.

Next, in FIG. 1, the processing of the micro region observation unit 101 will be described, and as a premise thereof, the imaging means 2 for a micro region, which is an input unit of the micro region observation unit 101, mainly observes a micro structure of a fracture surface at a magnification of 100 times or more. In particular, an imaging means utilizing an electron beam such as an electron microscope is preferable. This is because the electron beam has a deep focal depth, has severe irregularities such as a fracture surface, and is suitable for observing an object to be analyzed whose observation surface is inclined.

The micro region observation unit 101 includes an imaging means 2 for a micro region, a microscopic observation image storage means 5, a calculation means 6 for a degree of certainty of a fracture surface mode of an observation image, a calculation means 7 for an observation condition for improving the degree of certainty, and an imaging position/condition adjustment means 8.

The micro region observation unit 101 images the surface of the object to be analyzed 3 installed on the stage 4 by the imaging means 2 for a micro region, and stores the image in the microscopic observation image storage means 5. The observation image stored in the microscopic observation image storage means 5 is processed by the calculation means 6 for the degree of certainty of the fracture surface mode of the observation image and the calculation means 7 for the observation condition for improving the degree of certainty, and is displayed as information of the micro region on the observation recommendation condition visualization means 1 such as a monitor. In order to perform observation by appropriately changing the surface portion of the object to be analyzed 3, the relative position, angle, and the like in the imaging means 2 for a micro region are appropriately and variably adjusted by the imaging position/condition adjustment means 8, and the observation is continuously performed.

These apparatuses and processing functions constituting the micro region observation unit 101 of FIG. 1 will be described in more detail.

First, the microscopic observation image storage means 5 is for storing an observation image of a fracture surface obtained by the imaging means 2 for a micro region, and a recording medium such as a hard disk or a solid state drive is used. The observation image may be stored on a cloud.

As the calculation means 6 for the degree of certainty of the fracture surface mode of the observation image, a convolutional neural network that has learned the relationship between the fracture surface image and the fracture mode, or the like is used.

The calculation means 6 for the degree of certainty of the fracture surface mode inputs a fracture surface image to output the degree of certainty of each fracture mode to be classified. The captured image of the micro region (displayed in the small region R3 in FIG. 2) stored in the storage means 5 of the microscopic observation image is input to the calculation means 6 for a degree of certainty of a fracture mode of an observation image, the degree of certainty with respect to various fracture modes such as ductile fracture and fatigue fracture is output, and the input image and the degree of certainty with respect to each fracture mode are recorded. In order to reduce the calculation load, the image size may be reduced when the microscopic observation image is input to the calculation means 6 for a degree of certainty of a fracture surface mode of an observation image.

Figure 3:
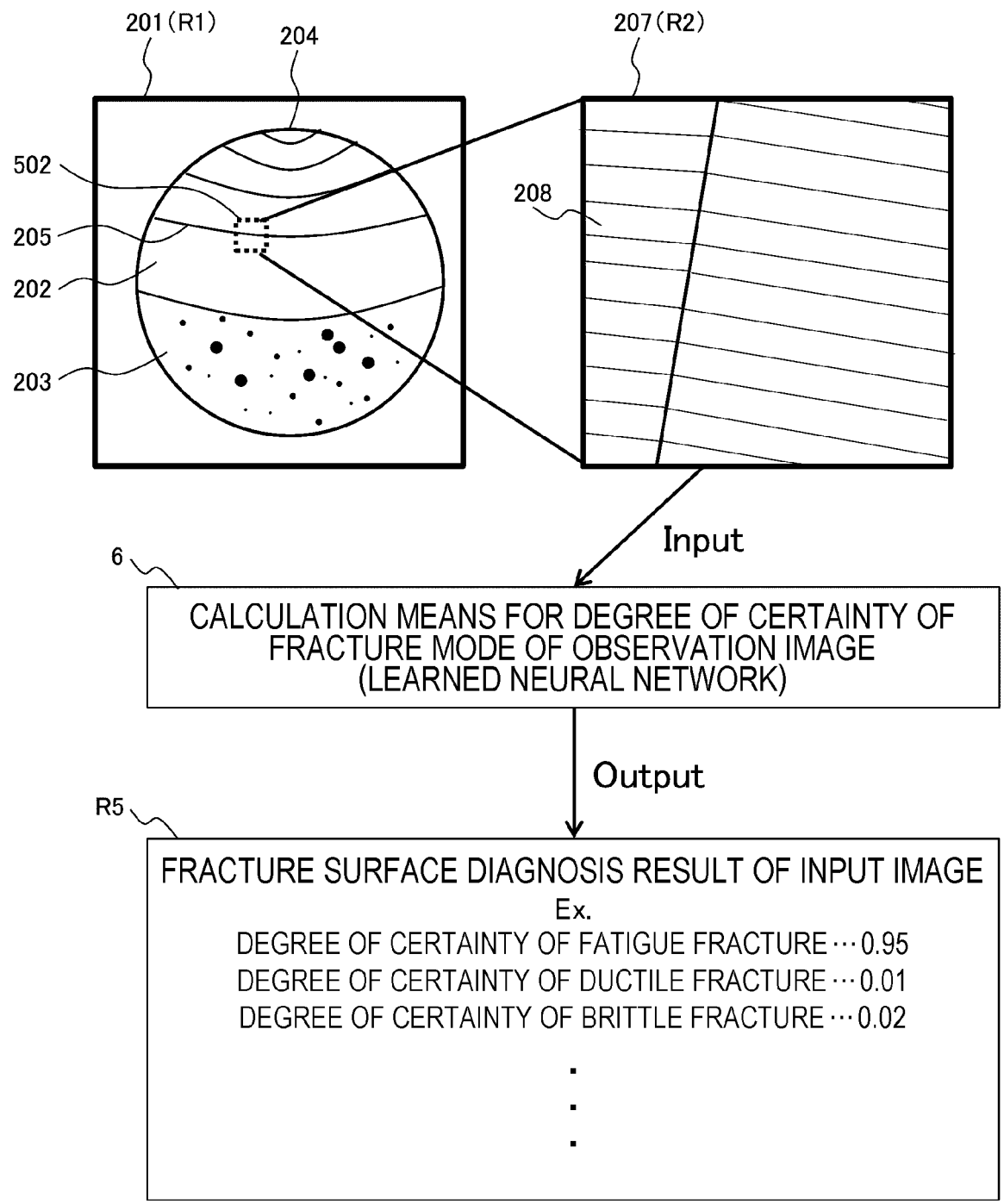
FIG. 3 is a diagram illustrating an example of processing by a calculation means 6 for a degree of certainty of a fracture surface mode of an observation image.

FIG. 3 is a diagram illustrating an example of processing by the calculation means 6 for a degree of certainty of a fracture surface mode of an observation image. In FIG. 3, an observation image 201 of a fracture surface on which a crack due to fatigue is generated and progressed and finally ductile fracture occurs is treated as a processing target. The observation image 201 illustrated in FIG. 3 is for the entire image displayed in the small region R1 in FIG. 2. As in the example displayed in the small region R1 of FIG. 2, the observation image 201 is an entire image including an observation image fatigue fracture surface region 202, a ductile fracture surface region 203, and a crack initiation point 204, and a partial region 502 thereof is displayed in the small region R2 of FIG. 2. The micro region observation unit 101 performs observation for the image 207 of the partial region 502.

Here, the fatigue fracture surface region 202 is observed by the imaging means 2 for a micro region, and in the micro region observation image 207, a more micro waveform pattern called striation 208 than a beach mark 205 is observed. When the micro region fracture surface image 207 is input to the calculation means 6 for a degree of certainty of a fracture surface mode of an observation image using a learned neural network, the degree of certainty with respect to various fracture mechanisms such as fatigue fracture and ductile fracture of the micro region fracture surface image 207 is output as an output to the display region R4 of FIG. 2.

The calculation means 7 for an observation condition for improving a degree of certainty searches for the observation condition with the highest degree of certainty on the basis of the change in the value of the mode with the maximum value among the degrees of certainty of each mode obtained by applying the calculation means 6 for a degree of certainty of a fracture surface mode of an observation image to the observation image by the imaging means 2 for a micro region obtained by slightly changing the observation position and condition. A system may be utilized in which an observation image observed at a low magnification of about $1/10$ of normal by the imaging means 2 for a micro region is divided into, for example, 16, and then the degree of certainty is compared in each divided region, and a portion with the highest degree of certainty is observed at a high magnification. As the degree of certainty is higher, it is considered that the characteristic pattern of the fracture surface according to the fracture mode appears more clearly, and the fracture surface diagnosis with high accuracy and high acceptability is achieved.

The calculation means 7 for an observation condition for improving a degree of certainty displays the processing result in the display region R3 of FIG. 2. In the display region R3 of FIG. 2, an operation direction, magnification, and the like are displayed as operation conditions for increasing the degree of certainty of observation.

The imaging position/condition adjustment means 8 adjusts the position of the stage 4, the acceleration voltage of the imaging means 2 for a micro region, the observation magnification, the brightness and contrast of imaging, and the observation magnification of the imaging means 102 in a macro region. The imaging position and the condition are set on the basis of the value of each adjustment parameter imparted by the observer through control software, but the imaging position and the condition may be automatically adjusted on the basis of the result obtained by the calculation means 7 for an observation condition for improving a degree of certainty.

In addition to the observation field image in the imaging means 2 for a micro region, the visualization means 1 displays the moving direction of the observation position recommended for improving the degree of certainty of diagnosis calculated by the calculation means 7 for an observation condition for improving a degree of certainty and a parameter change guideline defining the imaging condition. As a result, high-speed and highly accurate fracture surface diagnosis by an unskilled person is achieved. A liquid crystal display is usually used as the visualization means 1, but any means may be used as long as the recommended observation condition can be visualized.

Next, a series of processes contents in the fracture surface analysis apparatus illustrated in FIG. 1 will be described with reference to FIGS. 4 and 5.

Figure 4:
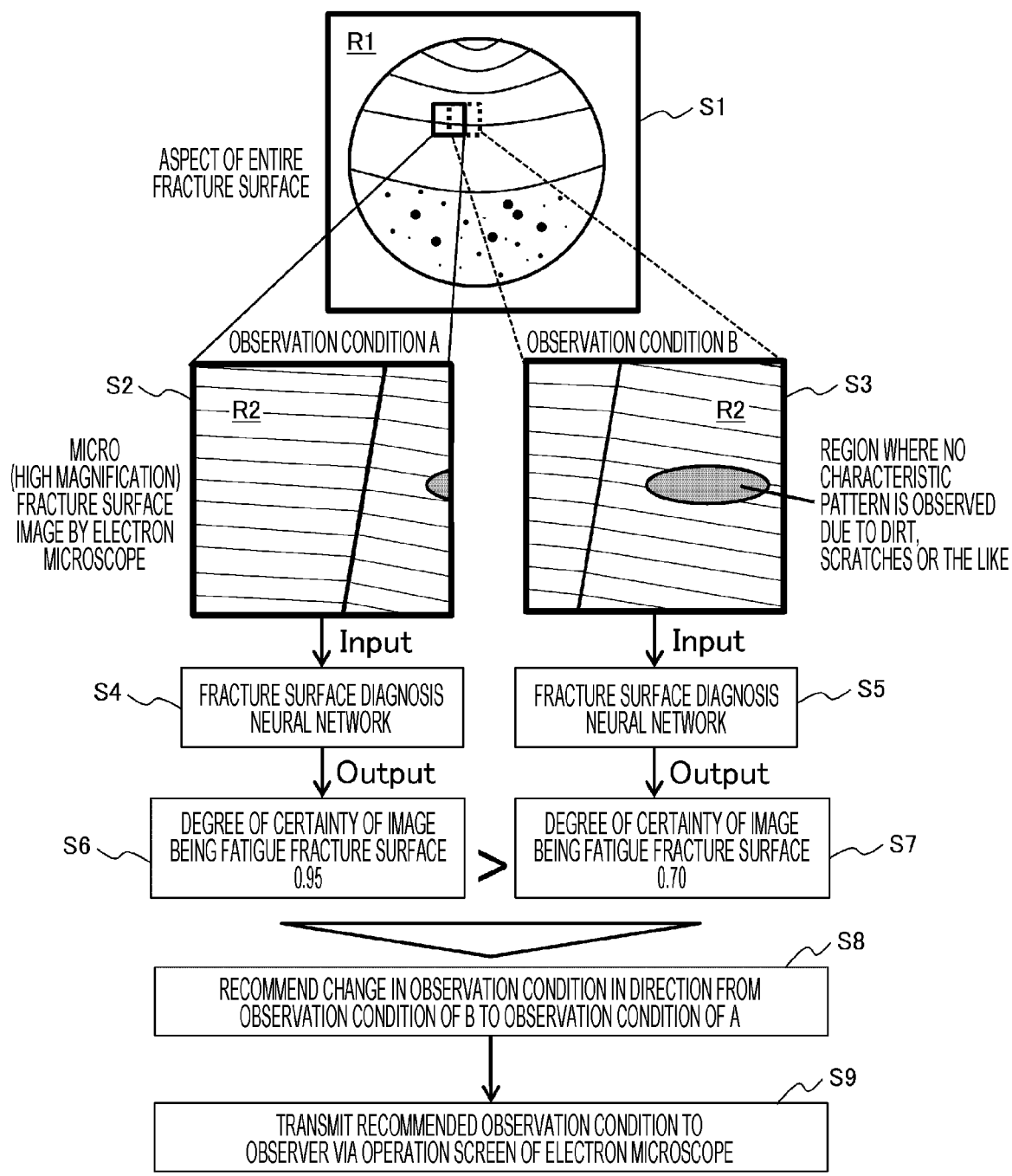
FIG. 4 is a diagram schematically illustrating a series of processes in a micro region observation unit 101.

FIG. 4 is a diagram schematically illustrating a series of processes in the micro region observation unit 101. According to the processing in FIG. 4, in processing step S1, the display content of the small region R1 indicating the aspect of the entire fracture surface of the object to be analyzed 3 is set as the observation target. In processing steps S2 and S3, images under the observation conditions A and B are obtained as micro (high magnification) fracture surface images by an electron microscope displayed in the display region of the small region R2. Neural network processing for the fracture surface diagnosis in processing steps S4 and S5 is performed on these images.

According to this diagnosis, when the observation condition is B, a region in which the characteristic pattern is not observed due to dirt, scratches, or the like is included, and as a result, in processing steps S6 and S7, it is calculated that the degree of certainty in the case of the observation condition A is 0.95 and the degree of certainty in the case of the observation condition B is 0.70 as the degree of certainty that the image is a fatigue fracture surface, and the calculated results are displayed in the small region R4.

Next, in processing step S8, it is determined that the change of the observation condition is recommended in the direction from the observation condition B to the observation condition A, and in processing step S9, display is performed in the small region R3.

A series of processes in FIG. 4 is performed for the purpose of supporting observation so that a fracture surface image in which a characteristic pattern unique to each fracture surface mode is as apparent as possible can be captured. In this case, the image in which the characteristic pattern appears is more likely to indicate a destruction mechanism.

In the implementation of FIG. 4, a fracture surface diagnosis neural network (in which, when an observation image is input, the degree of certainty of each fracture mode is output) in which a characteristic pattern according to the fracture surface mode is learned is prepared and used as follows.

First, observation images before and after changing the observation conditions (magnification, observation position, or the like) are input to the fracture surface diagnosis neural network by micro (high magnification) electron microscope observation. The observation image in which the characteristic pattern is more apparent has higher degree of certainty output from the neural network, and can be said to be appropriate as the observation condition. Therefore, it is possible to acquire the fracture surface image in which the characteristic pattern is more apparent by changing the observation condition in a direction in which the degree of certainty increases on the basis of the comparison result of the degree of certainty.

In addition, it is possible to support the acquisition of the image in which the characteristic pattern is apparent by transmitting the observation condition in the direction in which the degree of certainty increases to the observer as the recommended observation condition.

Figure 5:
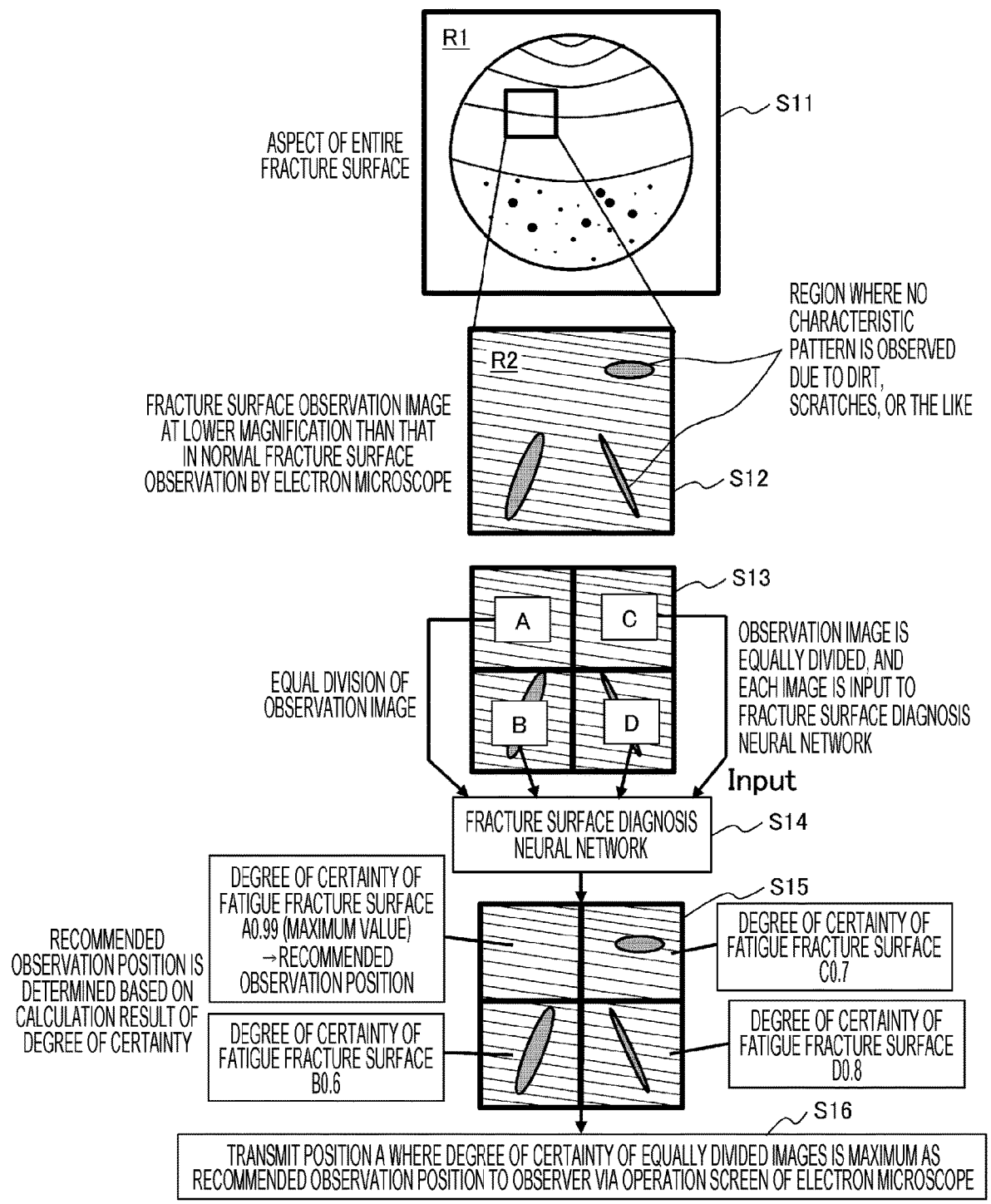
FIG. 5 is a diagram schematically illustrating another series of processes in the micro region observation unit 101.

FIG. 5 is a diagram schematically illustrating another series of processes in the micro region observation unit 101. According to the processing in FIG. 5, in processing step S11, the display content of the small region R1 indicating the aspect of the entire fracture surface of the object to be analyzed 3 is set as the observation target. In processing step S12, as a micro fracture surface image by an electron microscope displayed in the display region of the small region R2, a fracture surface observation image at a lower magnification than that in normal fracture surface observation by an electron microscope is obtained. As a result, an image of a broad region is obtained as a micro fracture surface image, and in this case, a relatively large number of regions where no characteristic pattern is observed due to dirt, scratches, or the like are observed. In FIG. 5, an image of a region where no characteristic pattern is observed is initially obtained.

Then, in processing step S13, the region of the image obtained at the low magnification is divided into a plurality of regions. Here, it is assumed that the observation image is divided into region A, B, C, and D. Neural network processing for the fracture surface diagnosis in processing step S14 is performed on each of these divided images.

According to the diagnosis on the plurality of divided screens in processing step S15, when the observation image is A, it is evaluated that there is no dirt, scratches, or the like and the degree of certainty of the fatigue fracture surface is 0.99, when the observation image is B, it is estimated that there is dirt, scratches, or the like and the degree of certainty of the fatigue fracture surface is 0.6, when the observation image is C, it is estimated that there is dirt, scratches, or the like and the degree of certainty of the fatigue fracture surface is 0.7, and when the observation image is D, it is estimated that there is dirt, scratches, or the like and the degree of certainty of the fatigue fracture surface likelihood is 0.8. On the basis of the result of evaluating the degree of certainty, in processing step S15, the degree of certainty when the image is the observation image A indicates the maximum value as the degree of certainty that the image is a fatigue fracture surface, and it is determined that the image is optimal as the recommended observation position. In processing step S16, this fact is displayed in the small region R4.

A series of processes in FIG. 5 is performed for the purpose of supporting observation so that a fracture surface image in which a characteristic pattern unique to each fracture surface mode is as apparent as possible can be captured. In this case, the image in which the characteristic pattern appears is more likely to indicate a destruction mechanism.

In the series of processes in FIG. 5, an observation image of the fracture surface is acquired at a lower magnification than that in normal fracture surface observation using an electron microscope, the observation image is equally divided, the equally divided images are input to the neural network, and the degree of certainty is calculated.

It is considered that, in the equally divided images, in a region having the highest degree of certainty, a characteristic pattern corresponding to the fracture surface mode is most apparent, and it is highly likely that an image in which the characteristic pattern is apparent can be acquired. Therefore, the position of the image with the highest degree of certainty in the equal images is transmitted to the observer as the recommended observation position, thereby supporting the acquisition of the image in which the characteristic pattern is apparent.

REFERENCE SIGNS LIST 1 visualization means
2 imaging means for micro region
3 object to be analyzed
4 stage
5 microscopic observation image storage means 6 calculation means for degree of certainty of fracture surface mode of observation image
7 calculation means for observation condition for improving degree of certainty
8 imaging position/condition adjustment means
12 imaging means for macro region
20 display screen of visualization means
202 fatigue fracture surface region
203 ductile fracture surface region
204 crack initiation point
205 beach mark
206 acquisition position of microscopic observation image
207 microscopic observation image
208 striation
209 calculation result of degree of certainty of each fracture mode by calculation means for degree of certainty of fracture surface mode of observation image
502 acquisition position of microscopic observation image on macro fracture surface

The invention claimed is:

1. A fracture surface analysis apparatus comprising:
an electronic scanning microscope;
a stage, wherein an object to be analyzed is fixed to the stage;
a first neural network, wherein the first neural network is trained to identify respective fracture modes, and
a display;
wherein the fracture surface analysis apparatus is configured to:
obtain a first observation image from the electron scanning microscope, wherein the first observation image includes a first portion of a-micro region of the object,
calculate, using the first neural network, a first degree of certainty of a fracture mode based on the first observation image,
obtain a second observation image from the electron scanning microscope, wherein the second observation image includes a second portion of the micro region,
calculate, using the first neural network a second degree of certainty of the fracture mode based on the second observation image,
calculate an observation condition for improving a degree of certainty of the fracture mode based on the first degree of certainty and the second degree of certainty,
output the observation condition for improving the degree of certainty of the fracture mode on the display.

2. The fracture surface analysis apparatus according to claim 1,
wherein the first degree and the second degree of certainty of the fracture mode are a difference from a degree of certainty at that position or the degree of certainty under the observation condition for improving the degree of certainty of the fracture mode.

3. A fracture surface analysis method comprising:
obtaining a first observation image obtained from an electron scanning microscope, wherein the first observation image includes a first portion of a micro region of an object to be analyzed;
calculating, using a first neural network, a first degree of certainty of a fracture mode based on the first observation image;
obtaining a second observation image from the electron scanning microscope, wherein the second observation image includes a second portion of the micro region;
calculating, using the first neural network a second degree of certainty of the fracture mode based on the second observation image;
calculating an observation condition for improving a degree of certainty of the fracture mode based on the first degree of certainty and the second degree of certainty; and
adjusting an imaging condition of the electron scanning microscope based on the observation condition for improving the degree of certainty of the fracture mode.

4. The fracture surface analysis method of claim 3, wherein
the first observation image and the second observation image are obtained by dividing an image received from the electron scanning microscope is into a plurality of regions.

5. The fracture surface analysis method according to claim 3,
wherein the first degree and the second degree of certainty of the fracture mode are a difference from a degree of certainty at that position or the degree of certainty under the observation condition for improving the degree of certainty of the fracture mode.

6. The fracture surface analysis apparatus of claim 1, wherein the first observation image and the second observation image are obtained by dividing an image received from the electronic scanning microscope into a plurality of regions.

7. The fracture surface analysis apparatus of claim 1, wherein the fracture surface analysis apparatus is further configured to:
adjust a position of the stage based on the observation condition for improving the degree of certainty of the fracture mode.

* * * * *